(12) United States Patent
Woodward

(10) Patent No.: US 10,589,884 B2
(45) Date of Patent: Mar. 17, 2020

(54) PROCESS AND APPARATUS FOR PRODUCING PACKETS

(71) Applicant: Conopco, Inc., Englewood Cliffs, NJ (US)

(72) Inventor: Adrian Michael Woodward, Bury St Edmonds (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 271 days.

(21) Appl. No.: 15/270,404

(22) Filed: Sep. 20, 2016

(65) Prior Publication Data
US 2017/0008653 A1 Jan. 12, 2017

Related U.S. Application Data

(62) Division of application No. 13/977,971, filed as application No. PCT/EP2011/072030 on Dec. 7, 2011.

(30) Foreign Application Priority Data

Jan. 13, 2011 (EP) ..................... 11150813

(51) Int. Cl.
*B29C 51/42* (2006.01)
*B65B 29/02* (2006.01)
(Continued)

(52) U.S. Cl.
CPC ............ *B65B 29/02* (2013.01); *B29C 51/004* (2013.01); *B29C 51/08* (2013.01); *B29C 51/265* (2013.01);
(Continued)

(58) Field of Classification Search
CPC ..... B65B 29/028; B29C 51/004; B29C 51/08; B29C 51/082; B29C 51/087; B29C 51/428; B29L 2031/7122; B65D 85/808
See application file for complete search history.

(56) References Cited

U.S. PATENT DOCUMENTS 3,488,413 A 1/1970 Watts, Jr.
3,549,381 A 12/1970 Kinsinger
(Continued)

FOREIGN PATENT DOCUMENTS

CN 101056747 10/2007
EP 0631948 1/1995
(Continued)

*Primary Examiner* — Atul P. Khare
(74) *Attorney, Agent, or Firm* — Foley & Lardner LLP

(57) ABSTRACT

Provided is a process for thermoforming a gas and liquid permeable layer (10) of thermoplastic material having an average thickness of less than 1.0 mm, the process comprising the steps of bringing the layer of thermoplastic material, at a temperature below that required for thermoforming, into contact with a mould (16) at a temperature above that of a thermoforming temperature of the thermoplastic material; pressing the mould into contact with the layer of thermoplastic material, the contact between mould and thermoplastic material causing heat to transfer from the mould to the thermoplastic material and raising the temperature of the thermoplastic material to a thermoformable temperature; such pressing thereby causing thermoforming of the thermoplastic material to conform to the shape of the mould.

16 Claims, 1 Drawing Sheet

Figure 1:
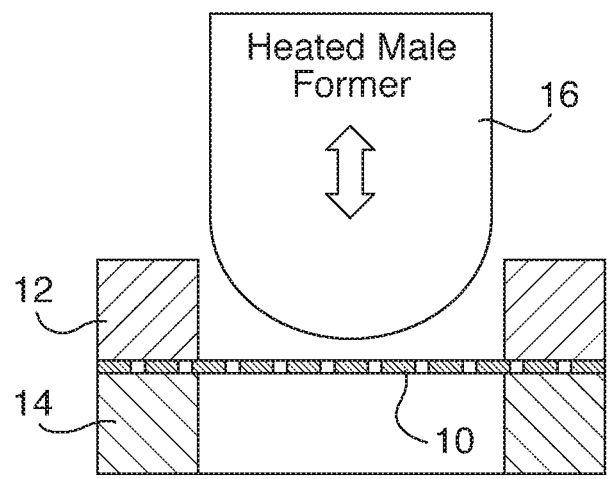

(51) Int. Cl.
  *B29C 51/00*   (2006.01)
  *B29C 51/08*   (2006.01)
  *B65B 47/02*   (2006.01)
  *B65B 11/50*   (2006.01)
  *B29C 51/26*   (2006.01)
  *B65D 85/808*   (2006.01)
  *B29K 67/00*   (2006.01)
  *B29L 31/00*   (2006.01)

(52) U.S. Cl.
  CPC .......... *B29C 51/421* (2013.01); *B29C 51/428* (2013.01); *B65B 11/50* (2013.01); *B65B 29/028* (2017.08); *B65B 47/02* (2013.01); *B29K 2067/00* (2013.01); *B29K 2067/003* (2013.01); *B29K 2067/046* (2013.01); *B29K 2995/0065* (2013.01); *B29K 2995/0068* (2013.01); *B29L 2031/7122* (2013.01); *B65D 85/808* (2013.01)

(56) References Cited

U.S. PATENT DOCUMENTS

| | | | |
|---|---|---|---|
| 3,962,392 A * | 6/1976 | Conner, Jr. | B29C 35/16 264/512 |
| 4,555,378 A * | 11/1985 | Martin | B29C 51/08 264/219 |
| 5,444,113 A | 8/1995 | Sinclair et al. | |
| 7,498,281 B2 * | 3/2009 | Iwasaki | B65D 85/8043 428/219 |
| 2004/0013831 A1 * | 1/2004 | Whittaker | D21H 13/24 428/35.2 |
| 2005/0136155 A1 * | 6/2005 | Jordan | B65D 65/466 426/77 |
| 2008/0095959 A1 | 4/2008 | Warner et al. | |
| 2011/0151060 A1 | 6/2011 | Nakagiri | |
| 2012/0269933 A1 | 10/2012 | Rapparini | |

FOREIGN PATENT DOCUMENTS

| | | |
|---|---|---|
| FR | 1420401 | 12/1965 |
| GB | 1068914 | 5/1967 |
| GB | 2408252 | 5/2005 |
| JP | 53-134761 A2 | 10/1979 |
| JP | 63162236 | 7/1988 |
| JP | 524104 | 2/1993 |
| JP | 2001233317 | 8/2001 |
| JP | 2004503688 | 2/2004 |
| JP | 201064770 | 3/2010 |
| WO | WO8801935 | 3/1988 |
| WO | WO9501907 | 1/1995 |
| WO | WO9738345 | 10/1997 |
| WO | WO0196639 | 12/2001 |
| WO | WO2004033303 | 4/2004 |
| WO | WO2006072269 | 7/2006 |
| WO | WO2010021181 | 2/2010 |

* cited by examiner

PROCESS AND APPARATUS FOR PRODUCING PACKETS

This application is a Divisional of U.S. Ser. No. 13/977,971, filed Jul. 2, 2013

TECHNICAL FIELD OF THE INVENTION

The present invention relates to the manufacture of packets, in particular to infusion packets such as tea bags having a pre-determined three-dimensional shape.

BACKGROUND TO THE INVENTION

For many years infusion packets, such as tea bags were available primarily as square or round two-ply sheets of porous filter material, typically made of paper, with the infusible material, such as tea, sandwiched between the sheets. Such packets restrict the flow of infusible material within the packet substantially to two dimensions. As a result the infusion performance of such packets is limited.

Thus the past few decades have seen the development of mass-produced infusion packets which have a more three-dimensional shape and which allow the infusible substance more room to move. Of particular success have been the tetrahedral-shaped packets such as those described in the international patent applications published as WO 95/01907 (Unilever) and WO 2004/033303 (I.M.A. SPA).

In the manufacture of tetrahedral packets, the tetrahedral shape is conventionally formed by making mutually perpendicular transverse seals in a tube of filter material and apparatus designed for such manufacture is ill-suited to the manufacture of other three-dimensional shapes.

Therefore, it would be desirable to develop a process which can manufacture a variety of three-dimensional shapes.

Definitions

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

SUMMARY OF THE INVENTION

The inventors have realised that known thermoforming processes, whilst capable of generating a variety of three-dimensional shapes, are not suitable for use with infusion packet material.

Firstly, infusion packets are most commonly made of paper, which is not thermoformable. Secondly, even if they were made from a thermoformable material, they would be inappropriate for thermoforming due to their porosity and thinness of the material.

Known thermoforming processes involve a first step of heating the material followed by a second step of thermoforming the material. The very small heat capacity of infusion packet material means that any heating will quickly be lost and so this approach will not work.

Even if a way of solving the heating problem could be found, the porosity of the material prevents the use of air pressure to form the material. Known thermoforming techniques typically involve the use of air pressure to form the material. However, the porosity of infusion packet material makes this approach impractical, as any difference in air pressure across the material will quickly equalise.

If air pressure is not used, and a mould was pressed into the material then only a limited number of three-dimensional shapes could be formed due to the fragility of any porous and thin infusion packet material.

Thus, it would seem that thermoforming is not a practical method of generating a wide variety of three-dimensional shapes from infusion packet material.

However, surprisingly the present inventors have overcome these barriers and developed a thermoforming process that can produce three-dimensional shapes from infusion packet material.

Thus, the invention relates to a process for thermoforming a gas and liquid permeable layer of thermoplastic material having an average thickness of less than 1.0 mm, the process comprising the steps of bringing the layer of thermoplastic material, at a temperature below that required for thermoforming, into contact with a mould at a temperature above that of a thermoforming temperature of the thermoplastic material; pressing the mould into contact with the layer of thermoplastic material, the contact between mould and thermoplastic material causing heat to transfer from the mould to the thermoplastic material and raising the temperature of the thermoplastic material to a thermoformable temperature; such pressing thereby causing thermoforming of the thermoplastic material to conform to the shape of the mould.

Thus, no heating of the thermoplastic material is carried out until thermoforming begins. As the thermoplastic material has such a low capacity to store heat, this means that it will rapidly heat up once it comes into contact with the heated mould, Thus, the invention takes the disadvantage of having a very low heat capacity and utilises this feature to develop a very effective thermoforming method for such materials.

As the temperature of the thermoplastic material is only indirectly controlled due to heating from the mould, variations in the temperature will exist during thermoforming. Thus, it is preferably that the thermoplastic material exhibits plastic deformation behaviour over a wide range of temperatures, preferably over a temperature range of at least 20° C., more preferably over a temperature range of at least 40° C.

The thermoplastic material may be made from a wide variety of materials, however polyethylene terephthalate (PET) and poly lactic acid (PLA) are preferred. Poly lactic acid (PLA) is particularly preferred due to it exhibiting plastic deformation over a wide range of temperatures.

In order for the process to be effective, the mould is preferably significantly hotter than the thermoplastic material. Thus, preferably the temperature difference between the mould and the thermoplastic material before coming into contact with the mould is greater than 40° C., preferably greater than 60° C., more preferably from 80° C. to 200° C.

In a preferred embodiment, the thermoplastic material is at room temperature prior to contact with the heated mould. Thus, the thermoplastic material before coming into contact with the mould is at a temperature of from 15° C. to 35° C.

As the primary application of the formed materials is as infusion packets, typically the material will be very thin, Thus, preferably the thermoplastic material has an average thickness of less than 0.5 mm, more preferably less than 0.20 mm, most preferably from 0.01 to 0.10 mm.

The thermoplastic material may be made from a variety of designs, but is preferably made from fibres of thermoplastic material, more particularly from woven thermoplastic fibres. Such fibres may have a diameter of less than 0.5 mm, preferably less than 0.25 mm, more preferably less than 0.10 mm, most preferably from 0.001 to 0.05 mm.

The temperature of thermoforming is sufficient to allow the thermoplastic material to deform under thermoforming stresses. Therefore, the temperature of the mould is preferably at least 100° C., more preferably from 120° C. to 210° C. so that the resulting material can tolerate temperatures up to this level without shrinking back to its original sheet form.

The primary application of the formed materials is as infusion packets, therefore the thermoformed thermoplastic material is preferably gas and liquid permeable. In particular, it is preferred that the thermoformed thermoplastic material is permeable to aqueous liquids.

The process according to the present invention is capable of generating three-dimensional shapes which can then be used as infusion packet material. For example, shapes such as tetrahedral, hemispherical and the like are possible.

Thus, the process is generally followed by the step of depositing a particulate product, typically comprising infusible entities such as tea leaves, into the thermoformed thermoplastic material. This step is then typically followed by sealing the thermoformed material to produce a sealed porous infusion packet.

Figure 2:
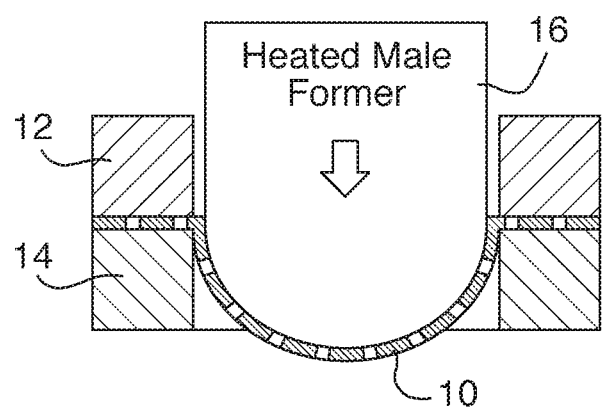

The invention will now by illustrated by way of example and with reference to the following figures, in which:

FIG. 1 is a schematic representation of thermoforming apparatus suitable for carrying out a process according to the present invention FIG. 2 is a schematic representation of the same apparatus as shown in FIG. 1 during carrying out a process according to the present invention.

Turning to the figures, FIG. 1 shows a woven sheet of 50 micrometres thick poly lactic acid 10 clamped in place by upper clamps 12 and lower clamps 14. The woven sheet 10 is at 20° C.

Positioned above the woven sheet is a male former 16, at a temperature of 120° C.

In use, the male former 16 moves downwards to come into contact with the woven sheet 10. As it makes contact, the portion of the woven sheet 10 that come into contact with the male former 16 rapidly heat up to 120° C. due to its very low heat capacity.

The male former continues to move downwards, heating and thermoforming the woven sheet simultaneously, until the male former is in the position shown in FIG. 2.

Once the woven sheet 10 is fully thermoformed, the male former retracts and the woven sheet rapidly cools and sets, again due to its very low heat capacity.

The invention claimed is:

1. A process for producing infusion packets with infusible tea leaves deposited therein, the process comprising the steps of:
   (i) providing a porous, gas and liquid permeable sheet of thermoplastic material having an average thickness of less than 0.5 mm,
      wherein:
         the sheet of thermoplastic material is made from woven fibers of polyethylene terephthalate or polylactic acid;
   (ii) pressing a mold into contact with the sheet of thermoplastic material provided at a temperature from 15° C. to 35° C., said mold having a tetrahedral or hemispherical conformity shape and a temperature of at least 100° C.,
      wherein:
         such pressing thereby thermoforms the sheet of thermoplastic material into conformity with the shape of the mold such that the thermoformed sheet takes the form of a packet shape; and
         heat transfer from the mold to the sheet of thermoplastic material raises the temperature of the sheet of thermoplastic material to a temperature in which the thermoplastic material exhibits plastic deformation behavior; followed by
   (iii) depositing infusible tea leaves into the thermoformed sheet of thermoplastic material; and further followed by
   (iv) sealing the thermoformed sheet of thermoplastic material into a sealed porous infusion packet with infusible tea leaves deposited therein.

2. The process according to claim 1, wherein the thermoplastic material exhibits plastic deformation behavior over a temperature range of at least 40° C.

3. The process according to claim 1, wherein the fibers have a diameter of less than 0.5 mm.

4. The process according to claim 3, wherein the fibers have a diameter of from 0.001 mm to 0.05 mm.

5. The process according to claim 1, wherein the sheet of thermoplastic material has an average thickness of less than 0.20 mm.

6. The process according to claim 1, wherein the sheet of thermoplastic material has an average thickness from 0.01 mm to 0.10 mm.

7. The process according to claim 1, wherein the temperature of the mold for said pressing step (ii) is from 120° C. to 210° C.

8. The process according to claim 1, wherein no heating of the sheet of thermoplastic material is carried out until said thermoforming begins.

9. The process according to claim 1, wherein the temperature difference between the mold and the sheet of thermoplastic material at a time of contact therebetween for said step (ii) of pressing is from 80° C. to 200° C.

10. A process for producing infusion packets with infusible tea leaves deposited therein, the process comprising the steps of:
   (i) providing a porous, gas and liquid permeable sheet of thermoplastic material having an average thickness from 0.01 mm to 0.10 mm,
      wherein:
         the thermoplastic material comprises polyethylene terephthalate or polylactic acid; and
         the sheet is made from woven fibers of the thermoplastic material;
   (ii) pressing a mold into the sheet of thermoplastic material provided at a temperature from 15° C. to 35° C., said mold having a tetrahedral or hemispherical conformity shape and a temperature of at least 100° C.,
      wherein:
         such pressing thereby thermoforms the sheet of thermoplastic material into conformity with the shape of the mold such that the thermoformed sheet takes the form of a packet shape; and
         heat transfer from the mold to the sheet of thermoplastic material raises the temperature of the sheet of thermoplastic material to a temperature in which the thermoplastic material exhibits plastic deformation behavior; followed by (iii) depositing infusible tea leaves into the thermoformed sheet of thermoplastic material; and further followed by (iv) sealing the thermoformed sheet of thermoplastic material into a sealed porous infusion packet with infusible tea leaves deposited therein.

11. The process according to claim 10, wherein the temperature of the mold for said pressing step (ii) is from 120° C. to 210° C.

12. The process according to claim 11, wherein the thermoformed sheet of thermoplastic material can tolerate up to 120° C. to 210° C. without shrinking back to its sheet form provided prior to step (ii).

13. The process according to claim 10, wherein the fibers have a diameter of less than 0.10 mm.

14. The process according to claim 13, wherein the fibers have a diameter of from 0.001 mm to 0.05 mm.

15. The process according to claim 10, wherein no heating of the sheet of thermoplastic material is carried out until said thermoforming begins.

16. The process according to claim 10, wherein the temperature difference between the mold and the sheet of thermoplastic material at a time of contact therebetween for said step (ii) of pressing is from 80° C. to 200° C.

* * * * *